(12) United States Patent
Liu et al.

(10) Patent No.: US 8,159,996 B2
(45) Date of Patent: Apr. 17, 2012

(54) CONTROL METHOD FOR REACCESSING AFTER THE TERMINAL IN THE TRUNKED SYSTEM HAS EXITED THE GROUP CALL

(75) Inventors: Xuemin Liu, Shenzhen (CN); Huiying Fang, Shenzhen (CN)

(73) Assignee: ZTE Corporation (CN)

( * ) Notice: Subject to any disclaimer, the term of this patent is extended or adjusted under 35 U.S.C. 154(b) by 997 days.

(21) Appl. No.: 12/091,600

(22) PCT Filed: Nov. 25, 2005

(86) PCT No.: PCT/CN2005/002005
§ 371 (c)(1),
(2), (4) Date: Apr. 25, 2008

(87) PCT Pub. No.: WO2007/059651
PCT Pub. Date: May 31, 2007

(65) Prior Publication Data
US 2008/0316991 A1 Dec. 25, 2008

(51) Int. Cl.
*H04B 7/216* (2006.01)
*H04Q 7/00* (2006.01)
*H04Q 7/28* (2006.01)

(52) U.S. Cl. ........ 370/320; 370/328; 370/335; 370/340; 370/342; 370/480

(58) Field of Classification Search .................. None
See application file for complete search history.

(56) References Cited

U.S. PATENT DOCUMENTS

| 6,343,216 | B1 * | 1/2002 | Kim et al. ............... 455/450 |
| 6,745,031 | B2 * | 6/2004 | Chun et al. ............. 455/435.1 |
| 7,852,998 | B1 * | 12/2010 | Smith et al. ............ 379/202.01 |
| 2002/0090947 | A1 * | 7/2002 | Brooks et al. ............ 455/436 |

FOREIGN PATENT DOCUMENTS

| CN | 1471314 A | 1/2004 |
| CN | 1585521 A | 2/2005 |
| WO | 03/021841 A | 3/2003 |
| WO | 2005/101695 A | 10/2005 |

OTHER PUBLICATIONS

Supplementary European Search Report in corresponding EP Application, Application No. EP 05 81 3859, mailed Feb. 2, 2009.

* cited by examiner

*Primary Examiner* — Jianye Wu
*Assistant Examiner* — Christine Duong
(74) *Attorney, Agent, or Firm* — Banner & Witcoff, Ltd.

(57) ABSTRACT

The present invention relates to a control method for re-access after the terminal in the trunking system exits the group call, which includes the following steps: it is to maintain one message number for every group call for updating and send the message number to the terminal when the call is established, and the terminal retains the message number after accessing the call; the terminal sets the exit symbol as "unable to passively access" when it exits the call normally, and as "able to passively access" when it exits the call abnormally; after the terminal has received periodically transmitted paging message in its idle state, it judges whether the exit symbol of the corresponding group is the type of "able to passively access", if yes, it accesses the call and then the procedure end; if the exit symbol is "unable to passively access", then the terminal judges whether the message number retained in the group is the same as the message number in the paging message, if not, it accesses the call, otherwise discards the paging message. According to the present invention, the terminal will not passively re-access the call because of receiving the periodical paging message after normally exiting the call, and at the same time, the terminal can re-access the call after abnormally exiting the call.

19 Claims, 3 Drawing Sheets

CONTROL METHOD FOR REACCESSING AFTER THE TERMINAL IN THE TRUNKED SYSTEM HAS EXITED THE GROUP CALL

This application is a National Stage application of co-pending PCT application PCT/CN2005/002005 filed Nov. 25, 2005, which was published in Chinese under PCT Article 21(2) on May 31, 2007. This application is incorporated herein by reference in its entirety.

TECHNICAL FIELD

The present invention relates to the mobile communication system, more specifically, to a control method for re-access after the terminal in trunking system exits the group call.

TECHNICAL BACKGROUND

Trunking system, due to its special application and the site in which it is used, requires fast access. The paging of traditional CDMA system takes a relatively long time to perform the processes of paging, paging response, then channel assignment, and acquisition, and its access speed can not meet the requirement of trunking application. Moreover, the paging of the traditional CDMA system is performed according to the IMSI address, one paging message can only be sent to one terminal, which means serial processing is adopted by the paging terminal, so the access time for a group with a lot of users would be very long and cannot meet the requirement for rapid access of the trunking system.

So the Grouping Identifier (GID) paging mode is applied. With all terminals matching GID paging address, only one paging message is needed to page all terminals in the group; the channel resource is directly carried in the paging message and sent to the terminal while paging the terminals, it largely saves the time for calling and speeds up the access of terminal. GID refers to grouping identifier, and different groups have different GIDs. GID address refers to the paging address generated via GID and it is unique for a specific group.

Group call usually has the limitation of dispatching area, namely, a certain group can only call in a specified area (such as an area including several geographically connected cells), and the terminal is not offered with the group call of said group outside the dispatching area. For example, if a group call is initiated by one terminal, the paging message is sent simultaneously to all cells within the dispatching area of the group (usually much smaller than the ordinary paging area of CDMA), after receiving the paging message, all terminals in the group within the dispatching area establish corresponding channel resource and access the call.

After the group call is established, in the cases that a terminal in the group is turned on within the dispatching area or enters the dispatching area from a non-dispatching area and etc., the delayed access of the terminal needs to be implemented after a signal is received from the base station. Considering that the dispatching system can not detect in real time the condition of the terminal which does not access the system, the base station side should periodically or non-periodically re-send the paging message. The usual solution is that the base station periodically sends the paging message until the call ends in the process of a group calling. Since the base station periodically sends the paging message, the paging message can be received only if the terminal is in idle state in the dispatching area, and based on this, the channel resource is established and the delayed access to the system is achieved.

During the calling, the terminal subscriber may exit the group call because of certain reasons, which can be divided into two conditions: one is abnormal exit, such as the terminal drops the call when it enters into tunnel not covered with signals, under this condition, the terminal should be guaranteed to be able to re-access after it receives the paging message periodically sent; the other is normal exit, such as the terminal subscriber actively exits the group call or the dispatching system sends release signaling to the terminal to ask it to exit one call and so on, in this condition, the subscriber should remain the exit state if it does not actively re-access. But with the present processing method, since the base station periodically sends the paging message, the terminal will still passively re-access after it normally exits the call because of receiving the paging message, which brings inconvenience and disturbance to the user's use and the dispatching management.

Moreover, after the terminal normally exits, the subscriber may need to re-access the group call, which requires the terminal capable of distinguishing the two conditions, not only able to prevent from passive re-accessing the call, but also able to actively re-access.

SUMMARY OF THE INVENTION

The technical problem to be solved by the present invention is to offer a control method for re-access after the terminal in the trunking system exits the group call, which can avoid passive re-access due to receiving periodical paging message for the normally exited terminal and guarantee re-access for the abnormally exited terminal.

In order to resolve the above technical problem, the present invention offers a control method for re-access after the terminal in the trunking system exits the group call, and the method includes the following steps:

(a) the dispatching system maintains one message number for every group call, updates the message numbers for various calls in the group, and sends this message number to the terminal when the call is established;

(b) the terminal receives and retains the message number of said group after accessing to the group call, the exit symbol is set as "unable to passively access" type when the terminal exits the group call normally, and as "able to passively access" type when the terminal exits the group call abnormally or the group call is released;

(c) after receiving the paging message of said group periodically transmitted from the base station, the terminal in the idle state judges whether the exit symbol of the corresponding group is "able to passively access" type, if yes, step (e) is performed; if the exit symbol is "unable to passively access" type, step (d) is performed;

(d) the terminal determines whether the message number retained for the group is the same as the message number in the paging message, if yes, discards the paging message; otherwise step (e) is performed;

(e) the terminal receives and processes the paging message and accesses the call, and retains the message number if it is new, ending.

Furthermore, the above method may also have the following feature: the method also includes the following control steps for the terminal actively initiating a group call after active exit: in said step (b), if the terminal normally exits the call by active exit, the exit symbol is set as "able to actively re-access", thereafter, when the terminal subscriber actively initiates said group call, the dispatching system judges whether said group call exists, if not, it is to process it as a new group call, ending; otherwise the network returns the paging message of the group, and the terminal re-accesses the call after receiving the paging message.

Furthermore, the above method may also have the following feature: said method also includes the following control steps for the terminal actively initiating the group call after exiting the group call required by the dispatching system: in said step (b), if the terminal normally exits the call because the dispatching system sends a release message, then said terminal exits this call after receiving this release message, and the exit symbol is set as "unable to actively re-access", thereafter, when the subscriber actively initiates said group call, the dispatching system refuses its re-access to said group call.

Furthermore, the above method may also have the following feature: said method also includes the following control steps for the terminal actively initiating the group call after exiting the group call required by the dispatching system: in said step (b), if the terminal normally exits the call because of the release message sent by the dispatching system, and said release message includes the indicating information of whether the re-access of the terminal is allowed, then said terminal exits this call after receiving the release message and sets the exit symbol as "able to actively re-access" or "unable to actively re-access" according to said indicating information, thereafter, when the terminal subscriber actively initiates said group call, the dispatching system judges whether said group call exists, according to the retained information that whether the terminal is allowed to re-access to the group call, the network returns the paging message allowing the access or refusing the access to the terminal, and the terminal accesses the system after it receives the paging message with the exit symbol of "able to actively re-access", and discards the paging message if the exit symbol is "unable to actively re-access".

Furthermore, the above method may also have the following feature: in said step (b), the terminal normally exits the call in the cases that the terminal actively exits and that the dispatching system requires the terminal to exit: when the terminal actively exits, the exit symbol is set as "able to actively re-access"; when the dispatching system requires the terminal to exit, the terminal sets the exit symbol as "able to actively re-access" or "unable to actively re-access" according to the indication from the dispatching system; thereafter, the method also includes the following control steps when the subscriber actively initiates the group call:

(f) the terminal in idle state actively initiates a call;

(g) after receiving said initiating call message, the dispatching system judges whether the group call exists or not, if yes, step (h) is performed, otherwise it is to process it as a new group call, ending;

(h) the dispatching system judges whether the terminal is assigned to exit and the re-access is refused in a group call, if yes, it is to return a message of call refusal and the terminal processes said message of call refusal, ending; otherwise, it is to allow the terminal to access and send the paging message of the group, and step (i) is performed;

(i) it is to judge whether the group identifier address of the paging message matches the group identifier address of initiating call of the terminal: if yes, step (j) is performed; otherwise the terminal discards the paging message, ending;

(j) the terminal judges whether the exit symbol of the group corresponding to the group identifier is "unable to actively re-access"; if yes, step (k) is performed; otherwise step (l) is performed;

(k) it is to judge whether the retained message number is the same as the message number in the paging message, if not, step (l) is performed; otherwise, the terminal discards the paging message, ending;

(l) the terminal receives and processes the paging message, and retains the message number in the paging message and sets the group exit symbol as "able to passively access", accesses the call, ending.

Furthermore, the above method may also have the following feature: said trunking system is CDMA trunking system.

Furthermore, the above method may also have the following feature: the exit symbol of the group is initialized as "able to passively access" when said terminal accesses a new group call or re-accesses one group call, and the exit symbol remains the same when the terminal exits abnormally.

Furthermore, the above method may also have the following feature: a sign is set when said terminal actively accesses, and after said terminal receives the paging message, it determines by the sign whether to perform the procedure where the paging message is received in idle state or the procedure where the paging message is received when the group call is actively initiated.

Furthermore, the above method may also have the following feature: when the dispatching system receives the group call actively initiated by the terminal and determines that said group call has already existed and the terminal is allowed to access, the network side returns the paging message of the group to the terminal, and the paging message is a paging message generated and sent by the dispatching system directed to the call by the terminal or a paging message periodically sent by the base station.

With said method of the present invention, it is guaranteed that the terminal will not passively re-access after it normally exits the call and can passively re-access after it abnormally exits the call in the trunking system adopting periodical paging method. Furthermore, the present invention can realize that the terminal is able to actively re-access the system after normal exit, and in the condition that the dispatching system requests the terminal exit, the terminal can be controlled as "able to actively re-access" or "unable to actively re-access" through setting. The present invention improves the control after the terminal exits the group call.

PREFERRED EMBODIMENT OF THE INVENTION

The present invention will be described in further detail with reference to the accompanying figures and embodiments.

Figure 1:
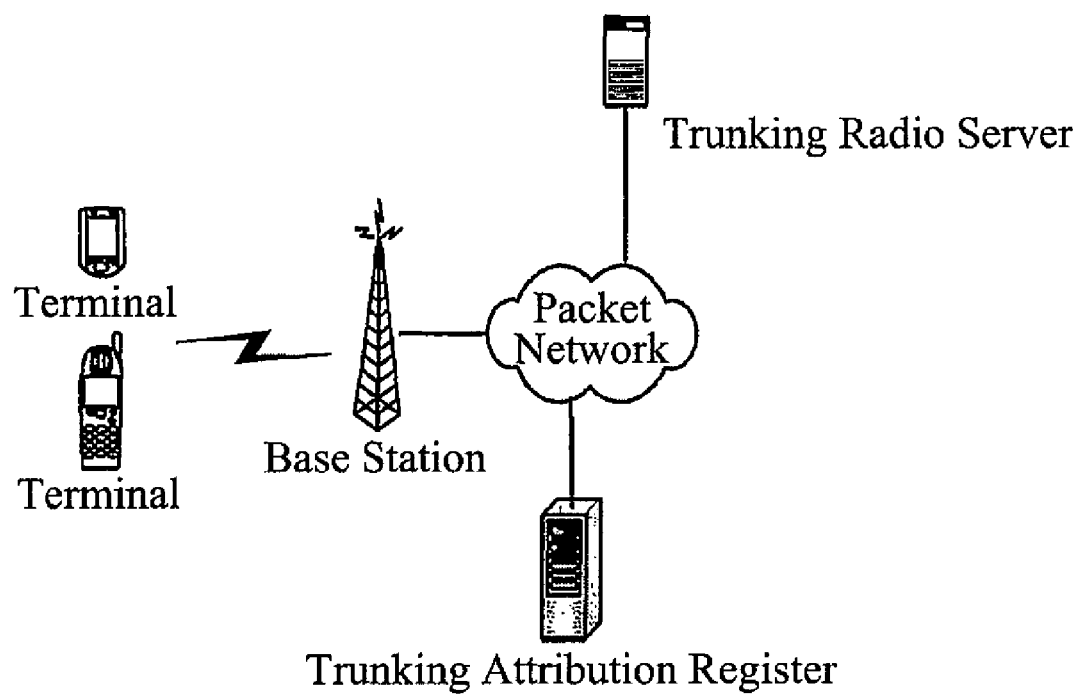
FIG. 1 is a schematic view of the system in accordance with an embodiment of the present invention.

The present embodiment will take CDMA trunking system as example, and the system applies periodical paging method according to GID. As shown in FIG. 1, the system includes the base station (BS), the mobile terminal and the dispatching system connected through packet network, and the dispatching system includes the trunking radio server and trunking attribution register.

The dispatching server maintains the message number of each group and updates the message numbers of different group calls in the same group to make sure that the message numbers of each call in a period of time are different. In each group call, the message number is sent to the terminal by the base station through the forward control channel message, and the terminal receives and retains the message number after it accesses the call.

In the present embodiment, the terminal maintains all exit symbols belonging to each group. The systems include "able to passively access" and "unable to passively access", among which, the "unable to passively access" further includes "able to actively re-access" and "unable to actively re-access". The "able to passively access" indicates that the terminal exits abnormally or the group call is released, and it is able to passively re-access the call after it receives periodical paging message. The "unable to passively access" indicates that the terminal exits normally and should not passively re-access the call. The "able to actively re-access" denotes that the terminal is able to actively re-access the call; while the "unable to actively re-access" means that the terminal can not actively re-access the call.

After the terminal accesses the group call (including re-accessing the previous call and accessing a new call), the exit symbol of the group is initialized as "able to passively access"; if the terminal abnormally exits during a group calling, the exit symbol is still "able to passively access" since the exit symbol is not reset, therefore, the terminal is able to re-access after it receives the periodical paging message of the call.

When the terminal actively exits during the group calling, the exit symbol of the group will be set as "able to actively re-access", so that the terminal is able to re-access the call through actively initiating a call and will not passively access before re-accessing the call through actively initiating a call.

If the dispatching system requires the terminal to exit, two conditions should be considered in the present embodiment: one is that the dispatching system allows the terminal to actively re-access the group call, while the other is the dispatching system does not allow the terminal to actively re-access the group call. The release message sent by the dispatching system carries the indication message and retains this setting. After the terminal receives the release message, it exits the call and sets the exit symbol as "able to actively re-access" or "unable to actively re-access" according to the indication message of the dispatching system in the release message.

Figure 2:
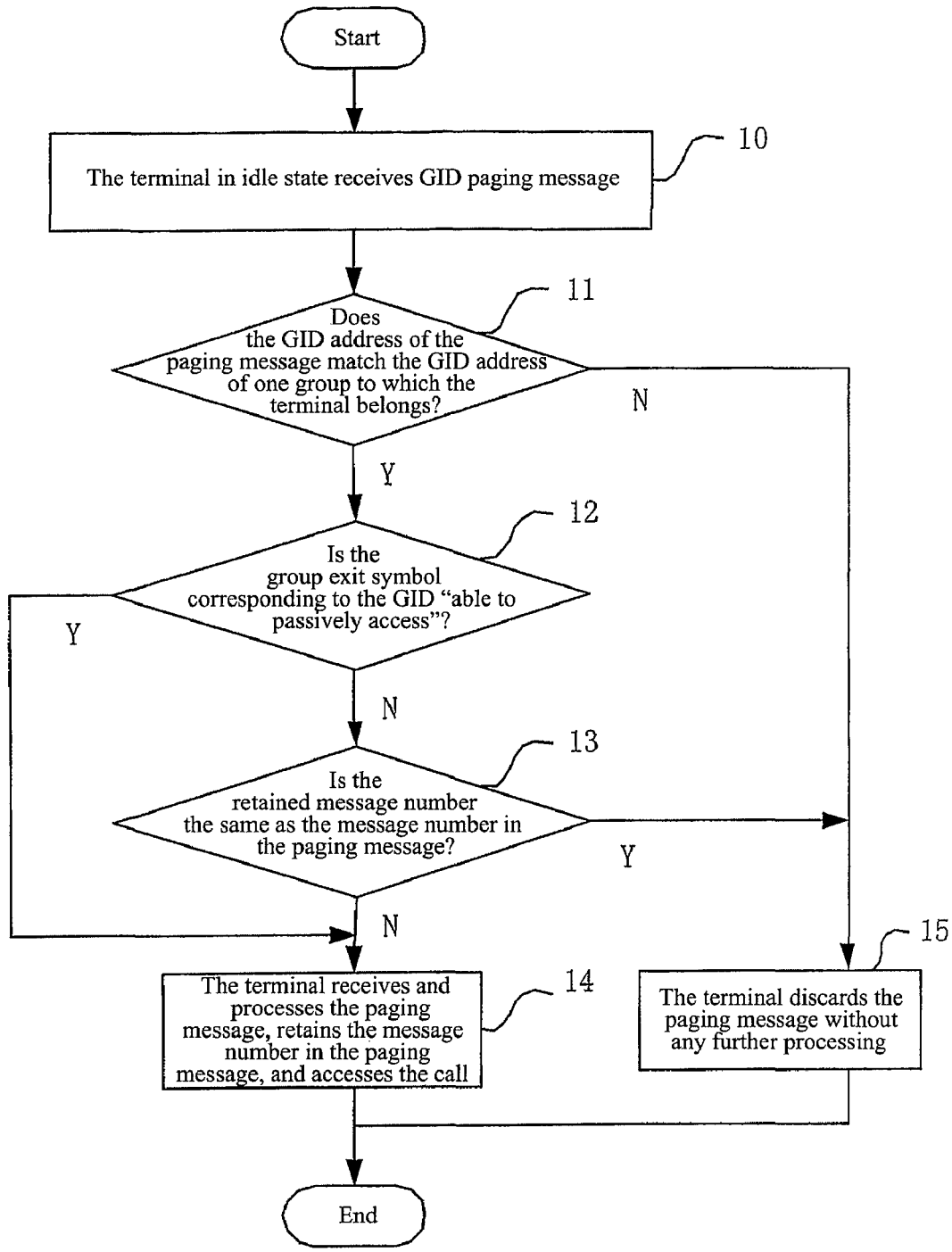
FIG. 2 is a flow chart of the terminal passive access in accordance with an embodiment of the present invention.

FIG. 2 shows the process of terminal passive access in accordance with an embodiment of the present invention:

step 10, the terminal in idle state receives GID paging message;

step 11, the terminal judges whether the GID address of the paging message matches with the GID address of one group (stored in the terminal side) to which the terminal belongs, if yes, step 12 is performed, otherwise step 15 is performed;

step 12, the terminal judges whether the group exit symbol corresponding to the GID is "able to passively access", if yes, step 14 is performed, otherwise step 13 is performed;

step 13, the terminal judges whether the retained message number is the same as the message number in the paging message, if not, step 14 is performed, otherwise step 15 is performed;

step 14, the terminal receives and processes the paging message, accesses the call, and retains the message number in the paging message, ending;

step 15, the terminal discards the paging message without any further processing, ending.

From the above steps, it can be seen that only when the exit symbol is "able to passively access" type, the terminal is able to passively re-access the system. It solves the problem that after the terminal normally or abnormally exits due to the paging message periodically sent by the base station, it will still re-access the system if it receives the paging message.

The setting of the message number distinguishes different calls in the same group and enables the terminal to easily access the call while not affected by the setting of the exit symbol when the terminal accesses a new group call of the group.

Figure 3:
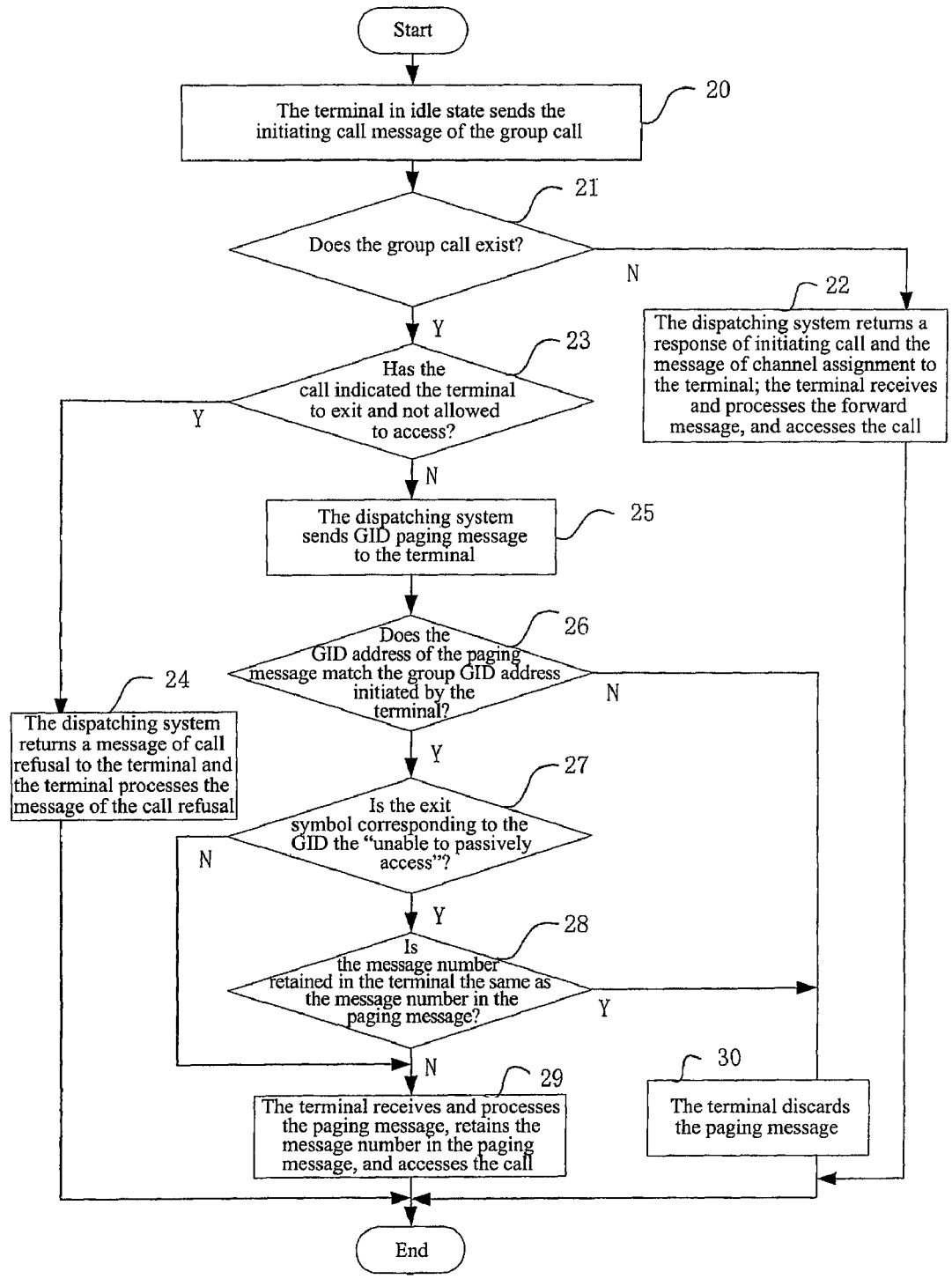
FIG. 3 is a flow chart of the terminal active access in accordance with an embodiment of the present invention.

FIG. 3 shows the procedure of a terminal subscriber actively initiating a group call to re-access after the terminal exiting a call of a certain group in accordance with the embodiment of the present invention. In fact, the previous group call may have been finished when the subscriber re-accesses, so the procedure is also adaptive to the processing of sending a new call.

step 20, the subscriber presses the group calling button, then the terminal in idle state sends a initiating call message of the group call;

step 21, after the dispatching system receives the initiating call message, it judges whether the group call exists or not, if yes, step 23 is performed, otherwise step 22 is performed;

step 22, the dispatching system returns the response of initiating a call and the message of channel assignment to the terminal to indicate that this call is a new call initiated by the terminal; the terminal receives and processes the forward message and accesses the call, ending;

step 23, the dispatching system judges if this call has indicated the terminal to exit and not allowed to access, if yes, step 24 is performed, otherwise step 25 is performed;

step 24, the dispatching system returns a call refusal message to the terminal, and the terminal processes the call refusal message, ending;

step 25, the dispatching system allows the terminal to access and sends the GID paging message to the terminal;

step 26, the terminal receives the GID paging message and judges if the GID address of the paging message matches the group GID address initiated by the terminal, if yes, step 27 is performed, otherwise step 30 is performed;

Here, the GID message received by the terminal can be a GID paging message specially sent by the dispatching system to the terminal after the dispatching system receives the initiating call message, or a GID paging message periodically sent by the base station. It should be noted that in this process, the terminal is not in idle state, so it performs the present process other than the process in FIG. 2. These two states can be distinguished by the sign of initiating call set when the terminal actively initiates a group call. After the terminal receives the GID paging message, it determines which process to be performed based on the sign.

step 27, the terminal judges whether the group exit symbol corresponding to the GID is "unable to actively re-access", if not, step 29 is performed, otherwise step 28 is performed;

step 28, the terminal judges whether the retained message number is the same as the message number in the paging message, if not, step 29 is performed, otherwise step 30 is performed;

step 29, the terminal receives and processes the paging message, accesses the call, retains the message number in the paging message, and initializes the corresponding group exit symbol as "able to passively access", ending;

step 30, the terminal discards the paging message without any further processing, ending.

If initiating call does not succeed, the terminal will display the corresponding prompt information.

To sum up, by maintaining the message number and the group exit symbol, the present invention implements the control for the terminal's re-access after the terminal in the trunking system exits the group call, and guarantees that the terminal will not passively re-access because of receiving periodical paging message after it normally exits the call, and that the terminal is able to re-access after it abnormally exits. Moreover, the present invention satisfies the dispatching system's control for whether the terminal is able to re-access the group call after exiting and the terminal's active re-access after the terminal actively exits the group call.

On the basis of the above-mentioned embodiment, the present invention can have a variety of changes. For example, three sub-methods for control processing are disclosed in the above embodiment: one is the processing method of the terminal receiving periodical paging message in the condition of normal or abnormal exiting, wherein through setting the message number and the exit symbol, the terminal avoids passive re-access to the call because of receiving periodical paging after normal exit; the second is the processing method of the terminal actively initiating a call and re-accessing after active exit, this method enables the terminal re-access after active exit on the basis of the process of FIG. 2; the third is the processing method of the dispatching system actively initiating a group call for the terminal after it requires the terminal to exit through releasing message, there are two cases in this method, one is that the dispatching system allows the terminal to actively re-access and the other is that the dispatching system does not allow the terminal to actively re-access. It should be mentioned that the basic technical effects of the present invention can be implemented with the first sub-method, while the second sub-method or the third sub-method can be used in combination with the first sub-method respectively, or the three sub-methods can be applied simultaneously according to the operator's configuration, thereby several embodiments are formed. The above-mentioned embodiment is the case where the three sub-methods are used together, yet the present invention is not limited to this.

In addition, for the condition that the dispatching system requires the terminal to exit through the release message, there are also other control strategies, for example, in another embodiment, it is configured that the terminal is not allowed to actively re-access the previous group call when the dispatching system requires the terminal to exit through the release message, other than the terminal being allowed or not allowed to actively re-access as in the above embodiment. Under this condition, the release message does not need to include relative indication message; the corresponding exit symbol is set as "unable to actively re-access" when the terminal receives the release message; and when the subscriber actively initiates a call, the terminal checks the exit symbol that it can not re-access the previous group call.

Industrial Application

The present invention can be applied in the trunking system adopting the periodical paging method. It guarantees that the terminal will not passively re-access after normal exit and can passively re-access after abnormal exit, and further realizes that the terminal is able to actively re-access the system after it normally exits.

What we claim is:

1. A control method for re-access after a terminal in a trunking system exits a group call, including the following steps of:
   (a) a dispatching system maintaining one message number for every group call, updating message numbers for various calls in one group, and sending this message number to the terminal when a call is established;
   (b) the terminal accessing to a group call, receiving and retaining the message number of the group, setting an exit symbol as "unable to passively access" type when the terminal exits the group call normally, and setting the exit symbol as "able to passively access" type when the terminal exits the group call abnormally or the group call is released;
   (c) the terminal in idle state receiving a paging message of said group periodically transmitted by a base station, judging whether the exit symbol of the corresponding group is "able to passively access" type, if yes, step (e) being performed; if the exit symbol is "unable to passively access" type, step (d) being performed;
   (d) the terminal determining whether the message number retained for the group is the same as the message number in the paging message, if yes, discarding the paging message; otherwise, step (e) being performed; and
   (e) the terminal receiving and processing the paging message, accessing the call, and retaining the message number if it is new.

2. The method of claim 1, characterized in further including the following control steps for the terminal actively initiating a group call after active exit: in said step (b), if the terminal normally exits the call by active exit, the exit symbol is set as "able to actively re-access", thereafter, when the terminal subscriber actively initiates said group call, the dispatching system judges whether said group call exists, if not, it is to process it as a new group call; otherwise a network side returns the paging message of the group, and the terminal re-accesses the call after receiving the paging message.

3. The method of claim 1, characterized in further including the following control steps for the terminal actively initiating the group call after exiting required by the dispatching system: in said step (b), if the terminal normally exits the call because the dispatching system sends a release message, then said terminal exits this call after receiving this release message, and the exit symbol is set as "unable to actively re-access", thereafter, when the subscriber actively initiates said group call, the dispatching system refuses its re-access to said group call.

4. The method of claim 1, characterized in further including the following control steps for the terminal actively initiating the group call after exiting required by the dispatching system: in said step (b), if the terminal normally exits the call because the dispatching system sends a release message, and the release message includes indicating information of whether re-access of the terminal is allowed, said terminal exits this call after receiving the release message and sets the exit symbol as "able to actively re-access" or "unable to actively re-access" according to said indicating information, thereafter, when the terminal subscriber actively initiates said group call, the dispatching system judges whether said group call exists, according to retained information that whether the terminal is allowed to re-access to the group call, the network side returns the paging message allowing access or refusing access to the terminal, and the terminal accesses the system after it receives the paging message with the exit symbol of "able to actively re-access", and discards the paging message if the exit symbol is "unable to actively re-access".

5. The method of claim 1, wherein in said step (b), the terminal normally exits the call in cases that the terminal actively exits and that the dispatching system requires the terminal to exit: when the terminal actively exits, the exit symbol is set as "able to actively re-access"; when the dispatching system requires the terminal to exit, the terminal sets the exit symbol as "able to actively re-access" or "unable to actively re-access" according to the indication from the dispatching system; thereafter, the method also includes the following control steps when the subscriber actively initiates the group call:
   (f) the terminal in idle state actively initiating a call;

(g) the dispatching system judging whether the group call exists or not after receiving initiating call message, if yes, step (h) being performed, otherwise processing it as a new group call;

(h) the dispatching system judging whether the terminal is assigned to exit and re-access is refused in a group call, if yes, returning a message of call refusal and the terminal processing said message of call refusal; otherwise, allowing the terminal to access and sending the paging message of the group, and step (i) being performed;

(i) judging whether group identifier address of the paging message matches group identifier address of the initiating call of the terminal, if yes, step (j) being performed; otherwise discarding the paging message;

(j) the terminal judging whether the exit symbol of the group corresponding to the group identifier is "unable to actively re-access", if yes, step (k) being performed; otherwise step (l) being performed;

(k) judging whether the retained message number is the same as the message number in the paging message, if not, step (l) being performed; otherwise, the terminal discarding the paging message; and (l) the terminal receiving and processing the paging message, retaining the message number in the paging message, setting the group exit symbol as "able to passively access", and accessing the call.

6. The method of claim 1, wherein said trunking system is a CDMA trunking system.

7. The method of claim 1, wherein the exit symbol of the group is initialized as "able to passively access" when said terminal accesses a new group call or re-accesses one group call, and the exit symbol remains the same when the terminal abnormally exits.

8. The method of claim 1, wherein a sign is set when said terminal actively accesses, and after said terminal receives the paging message, it determines by the sign whether to perform a procedure of that the paging message is received in idle state or perform a procedure of that the paging message is received when the group call is actively initiated.

9. The method of claim 2, wherein when the dispatching system receives the group call actively initiated by the terminal, and determines that the group call has already existed and the terminal is allowed to access, the network side returns the paging message of the group to the terminal, and the paging message is a paging message generated and sent by the dispatching system directed to the call by the terminal or a paging message periodically sent by the base station.

10. The method of claim 2, wherein said trunking system is a CDMA trunking system.

11. The method of claim 3, wherein said trunking system is a CDMA trunking system.

12. The method of claim 4, wherein said trunking system is a CDMA trunking system.

13. The method of claim 2, wherein the exit symbol of the group is initialized as "able to passively access" when said terminal accesses a new group call or re-accesses one group call, and the exit symbol remains the same when the terminal abnormally exits.

14. The method of claim 3, wherein the exit symbol of the group is initialized as "able to passively access" when said terminal accesses a new group call or re-accesses one group call, and the exit symbol remains the same when the terminal abnormally exits.

15. The method of claim 4, wherein the exit symbol of the group is initialized as "able to passively access" when said terminal accesses a new group call or re-accesses one group call, and the exit symbol remains the same when the terminal abnormally exits.

16. The method of claim 2, wherein a sign is set when said terminal actively accesses, and after said terminal receives the paging message, it determines by the sign whether to perform a procedure of that the paging message is received in idle state or perform a procedure of that the paging message is received when the group call is actively initiated.

17. The method of claim 3, wherein a sign is set when said terminal actively accesses, and after said terminal receives the paging message, it determines by the sign whether to perform a procedure of that the paging message is received in idle state or perform a procedure of that the paging message is received when the group call is actively initiated.

18. The method of claim 4, wherein a sign is set when said terminal actively accesses, and after said terminal receives the paging message, it determines by the sign whether to perform a procedure of that the paging message is received in idle state or perform a procedure of that the paging message is received when the group call is actively initiated.

19. The method of claim 4, wherein when the dispatching system receives the group call actively initiated by the terminal, and determines that the group call has already existed and the terminal is allowed to access, the network side returns the paging message of the group to the terminal, and the paging message is a paging message generated and sent by the dispatching system directed to the call by the terminal or a paging message periodically sent by the base station.

* * * * *